Patented June 12, 1923.

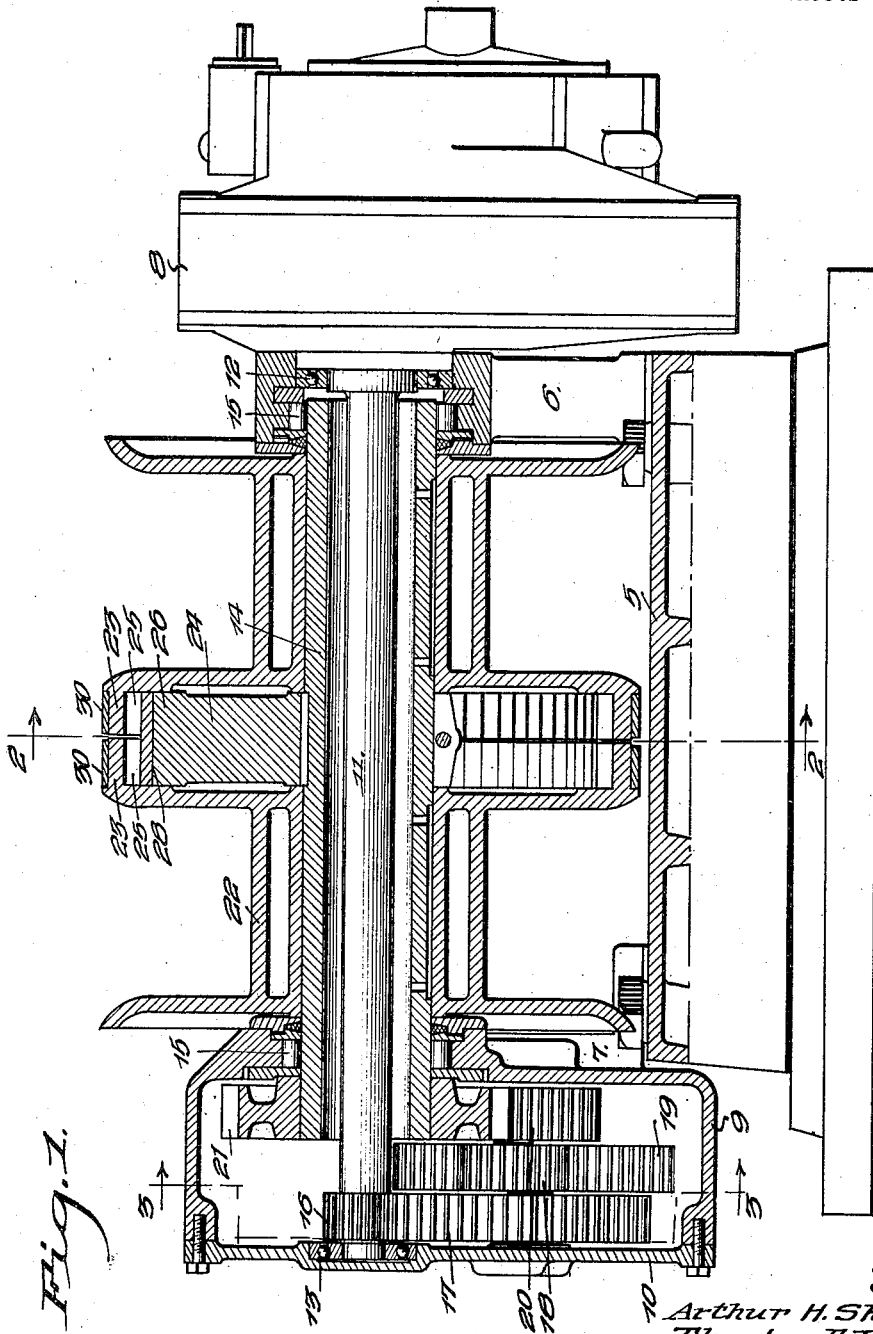

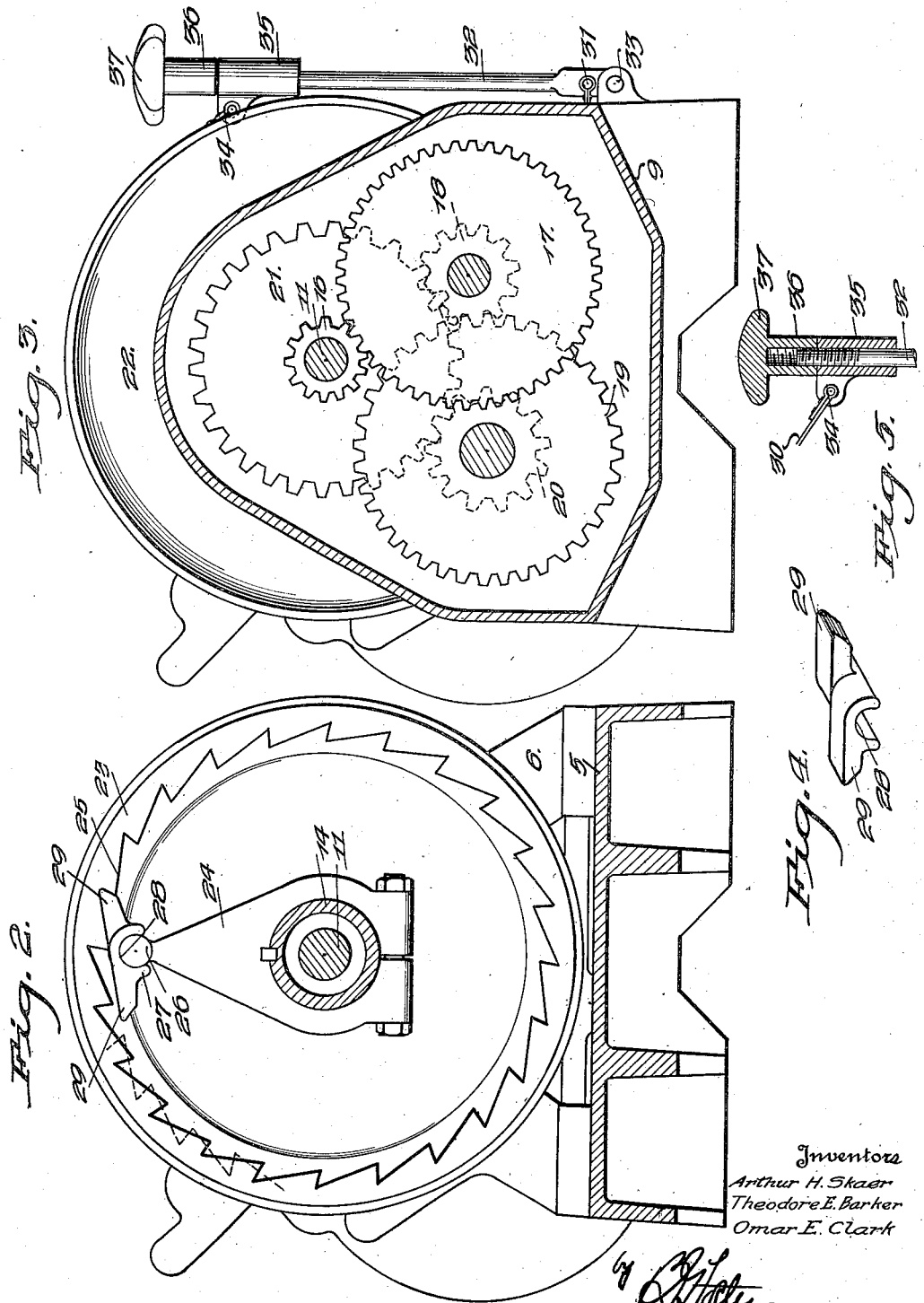

1,458,554

UNITED STATES PATENT OFFICE.

ARTHUR H. SKAER, THEODORE E. BARKER, AND OMAR E. CLARK, OF DENVER, COLORADO, ASSIGNORS TO THE DENVER ROCK DRILL MANUFACTURING COMPANY, OF DENVER, COLORADO, A CORPORATION OF DELAWARE.

REVERSIBLE DRUMS.

Application filed September 12, 1922. Serial No. 587,803. REISSUED

*To all whom it may concern:*

Be it known that we, ARTHUR H. SKAER, THEODORE E. BARKER, and OMAR E. CLARK, citizens of the United States, residing at Denver, in the county of Denver and State of Colorado, have invented certain new and useful Improvements in Reversible Drums, of which the following is a specification.

The present invention relates to winding drum mechanism of the type in which two drums are employed, driven from a common prime mover.

The preferred embodiment of the invention is illustrated in the accompanying drawings, wherein:—

Figure 1 is a longitudinal sectional view through the improved structure,

Figure 2 is a cross sectional view on the line 2—2 of Figure 1,

Figure 3 is a similar view on the line 3—3 of Figure 1,

Figure 4 is a detail perspective view of the pawl,

Figure 5 is a detail perspective view of the actuating means for one of the brake drums.

In the embodiment disclosed, a base 5 is employed having spaced supports 6 and 7. The support 6 carries a suitable reversible motor 8, which may be of any well-known or desired character. The support 7 is provided with a gear casing 9 having a removable cover plate 10.

Extending between the supports 6 and 7 and operated by the motor 8 is a motor shaft 11 having an anti-friction bearing 12 in the support 6 adjacent to the motor 8 and having an anti-friction bearing 13 in the cover plate 10. This shaft is surrounded by a tubular shaft 14 having roller bearings 15 in the supports 6 and 7. The shaft 11 carries a pinion 16 meshing with a gear 17 that is located in the gear case 9 and said gear 17 has secured thereto a pinion 18 meshing with a gear 19 that is fixed with relation to a pinion 20. The pinion 20 is in mesh with a gear wheel 21 fixed to the tubular shaft 14. It will thus be evident that the shaft 14 may be driven in either of opposite directions from the motor and at a reduced speed.

Journaled upon the shaft 14 are independent drums 22 having on their adjacent ends flanges 23 forming a housing, within which is rotatably mounted a head 24 carried by the shaft 14. The flanges are provided on their internal annular faces with ratchet teeth 25, the teeth of one drum being set reversely to the teeth of the other, as indicated by the dotted and full lines in Figure 2. The head 24 terminates in a transverse pivot 26, and mounted thereon is a double pawl 27 that thus turns on an axis parallel to the axes of the shafts and drums. Preferably this pawl has an open-sided socket 28 to receive the pivot 26. The pawl is provided with opposite offset teeth 29, each of which coacts with the opposite ratchet teeth of the drum flanges. It will thus be seen that if one of the teeth 29 is in interlocked abutting relation with one of the teeth 25 of one of the drums, the other tooth 29 will be out of coaction with the oppositely set teeth of the other drum and vice versa. It will furthermore be apparent that if the shaft 14 is rotated in one direction one of the drums will be clutched thereto, while the other will be free. Upon a reverse rotation of the shaft the pawl will automatically swing so as to bring the other tooth into coaction with the ratchet teeth of the other drum while the first mentioned pawl tooth will be released and the drum free to rotate.

In order to control the movement of the drum when free the flanges 23 preferably constitute braking surfaces and brake bands 30 are arranged thereupon. Preferably these brake bands are each connected at one end, as shown at 31, with a rod 32 pivotally mounted, as shown at 33 on the base, while the other end is fastened as illustrated at 34 to a sleeve 35 slidable upon the rod. A nut 36 adjustably threaded on the free end of the rod 32 bears upon the sleeve and is provided with a handle knob 37. By turning this nut the brake band can be tightened or loosened, as desired.

From the foregoing, it is thought that the construction, operation and many advantages of the herein described invention will be apparent to those skilled in the art, without further description and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. The combination with a pair of oppositely rotatable driven members, of a driving member common thereto and rotatable in opposite directions, and a clutch member movable with the driving member and pivoted thereon on an axis that is parallel to the axis of rotation of the driving member, said clutch member being movable to a position to connect one or the other of the driven members to the driving member accordingly as the later is moved in one direction or the other.

2. The combination with a driving shaft, and drums rotatable thereabout, of a clutch element pivotally mounted on the shaft on an axis parallel to the axes of rotation of the drums and shaft and having portions on opposite sides of its axis of rotation that are alternately movable respectively into and out of engagement with the drums accordingly as the direction of rotation of the shaft is reversed.

3. The combination with a reversible rotatable driving shaft, of alined separate drums rotatable thereabout and having adjacent flanged ends provided with internal inset oppositely disposed ratchet teeth, a head on the shaft extending between the drums within the adjacent flanges thereof, and a double pawl pivoted between its ends on the free end of the head parallel to the axis of the shaft and having oppositely disposed teeth that respectively engage the opposite ratchet teeth of the drums accordingly as the shaft is driven in opposite directions.

In testimony whereof, we affix our signatures in the presence of two witnesses.

ARTHUR H. SKAER.
THEODORE E. BARKER.
OMAR E. CLARK.

Witnesses:
DAVID B. SEELEY,
RALPH A. SCOTT.